US012779370B2

(12) United States Patent
Rohovec et al.

(10) Patent No.: US 12,779,370 B2
(45) Date of Patent: Nov. 3, 2026

(54) APPARATUS AND METHOD FOR SEPARATING FLUID MIXTURES

(71) Applicant: Messer SE & Co. KGaA, Bad Soden (DE)

(72) Inventors: Joachim Rohovec, Baden bei Wien (AT); Josha Herzog, Munich (DE); Thomas Berger, Essen (DE)

(73) Assignee: Messer SE & Co. KGaA, Bad Soden (DE)

( * ) Notice: Subject to any disclaimer, the term of this patent is extended or adjusted under 35 U.S.C. 154(b) by 318 days.

(21) Appl. No.: 18/294,418

(22) PCT Filed: Jul. 7, 2022

(86) PCT No.: PCT/EP2022/068904

§ 371 (c)(1),
(2) Date: Feb. 1, 2024

(87) PCT Pub. No.: WO2023/011843

PCT Pub. Date: Feb. 9, 2023

(65) Prior Publication Data

US 2024/0342631 A1 Oct. 17, 2024

(30) Foreign Application Priority Data

Aug. 5, 2021 (DE) ..................... 10 2021 004 050.3

(51) Int. Cl.
*B01D 19/00* (2006.01)
*B04C 3/00* (2006.01)
*C25B 15/08* (2006.01)

(52) U.S. Cl.
CPC ..... *B01D 19/0052* (2013.01); *B01D 19/0005* (2013.01); *B01D 19/0047* (2013.01); *B01D 19/0078* (2013.01)

(58) Field of Classification Search
CPC ............ B01D 19/0052; B01D 19/0005; B01D 19/0057; B01D 19/0047; B01D 19/0078
(Continued)

(56) References Cited

U.S. PATENT DOCUMENTS 2,706,045 A 4/1955 Large
4,348,289 A 9/1982 Snavely, Jr.
(Continued)

FOREIGN PATENT DOCUMENTS

DE 102004045823 A1 3/2006
DE 102009031103 A1 12/2010
(Continued)

OTHER PUBLICATIONS

International Search Report and Written Opinion in PCT/EP2022/068904, dated Sep. 30, 2022, 7 pages.

*Primary Examiner* — Frank M Lawrence, Jr.
(74) *Attorney, Agent, or Firm* — Andrus Intellectual Property Law, LLP

(57) ABSTRACT

The invention relates to an apparatus for separating fluid mixtures, being equipped with a nozzle for feeding a fluid mixture composed of a number of components of different density into a volume. The nozzle has a conical annular gap located between a conical inner face of a nozzle casing and a guide cone and opening out at its tip at a nozzle opening into the volume, and a fluid feed leading tangentially into the conical annular gap. Furthermore, the apparatus has a separator, which has a separation portion located in the volume and fluidically connected to a discharge line, and has an inlet opening arranged concentrically to the nozzle opening and axially spaced therefrom. The apparatus according to the invention enables an efficient and trouble-free separation of fluid mixtures, in particular the separation of dissolved gases from a liquid or suspension.

14 Claims, 4 Drawing Sheets

(58) Field of Classification Search
USPC .... 95/241, 254, 259, 261, 262; 96/155, 175, 96/188, 189, 193–200, 202, 203, 204, 96/206, 208, 209, 214, 216
See application file for complete search history.

(56) References Cited

U.S. PATENT DOCUMENTS

| | | | | |
|---|---|---|---|---|
| 5,566,835 | A | 10/1996 | Grimes | |
| 5,755,965 | A | 5/1998 | Reiber | |
| 6,036,027 | A | 3/2000 | Grimes | |
| 6,119,870 | A | 9/2000 | Maciejewski | |
| 6,599,422 | B2 | 7/2003 | Constantine | |
| 2004/0256312 | A1* | 12/2004 | Gomez | B03C 1/30 210/512.3 |
| 2010/0006516 | A1* | 1/2010 | Schook | B01D 19/0057 210/512.1 |
| 2010/0083832 | A1* | 4/2010 | Pondelick | B04C 9/00 95/261 |
| 2011/0245750 | A1* | 10/2011 | Lynch | A61M 1/3627 95/260 |
| 2015/0174508 | A1* | 6/2015 | Bozic | B04C 3/06 210/188 |
| 2016/0263588 | A1* | 9/2016 | Tucker | B01D 17/0208 |

FOREIGN PATENT DOCUMENTS

| | | | |
|---|---|---|---|
| DE | 102010047760 | A1 | 4/2012 |
| EP | 1429858 | A1 | 6/2004 |
| EP | 2983733 | A1 | 2/2016 |
| EP | 3624914 | A1 | 3/2020 |
| FR | 2588779 | A1 | 4/1987 |
| WO | 2003002227 | A1 | 1/2003 |
| WO | 2014192896 | A1 | 12/2014 |
| WO | 2017080626 | A1 | 5/2017 |

* cited by examiner

APPARATUS AND METHOD FOR SEPARATING FLUID MIXTURES

CROSS-REFERENCE TO RELATED APPLICATIONS

The present application is the U.S. national stage application of international application PCT/EP2022/068904 filed Jul. 7, 2022, which international application was published on Feb. 9, 2023, as International Publication WO 2023/011843 A1. The international application claims priority to German Patent Application No. 10 2021 004 050.3 filed Aug. 5, 2021. The international and German applications are hereby incorporated by reference herein.

FIELD

The invention relates to an apparatus and to a method for separating fluid mixtures.

BACKGROUND

Separating fluid mixtures plays an important role in many sectors of industry. For example, process water has to be degassed in order to be less corrosive or damaging to plants in many fields of application. In order to condition water prior to an electrolysis, argon dissolved in the water has to be removed. Further applications are to be found, for example, in the food industry, in particular in the production of beer and wine, in medicine, for instance in dialysis, in the preparation of drinking water, or in the dewatering or degassing of oils and lubricants. Furthermore, there is often the task of separating suspensions, emulsions or azeotropic mixtures.

Various methods are used in the case of degassing liquids. For example, vacuum pumps are utilized to reduce the saturation concentration of a gas dissolved in a liquid by reducing pressure, as a result of which said gas can be degassed and removed from the liquid. However, this method is very complex, at least in a continuous operation, because it requires at least one further pump for conveying the liquid to be degassed, in addition to the vacuum pump. Moreover, the complexity in terms of maintenance is very high in particular in the case of vacuum pumps which are used for degassing liquids which are heavily loaded with solids and/or corrosive liquids.

Randomly packed columns in which the liquid to be degassed is brought into contact with a stripping gas, for example carbon dioxide, which is inert relative to the liquid to be degassed, are used in particular in the food industry. A method of this type is described in EP 3 624 914 A1, for example. The temperature may also be increased in addition to the use of a stripping gas, so as to reduce the gas solubility. However, this method is also very complex in terms of plant technology, maintenance and energy consumption. Moreover, an additional substance in the form of the stripping gas has to be provided, the use of which may potentially be associated with adverse side effects, for example in that said substance has a corrosive effect on constituent parts of the device, or is toxic to microorganisms contained in the liquid.

A degassing apparatus for removing gases such as ambient air from fluids such as oil is known from WO 2017/080626 A1, for example. The apparatus has a permeable membrane which allows the gas to be removed from the fluid to pass through, while retaining the liquid proportion of the fluid. However, in membrane plants of this type it is disadvantageous that the pores are contaminated over time ("membrane fouling"), productivity being diminished as a result.

Furthermore used are ultrasonic degassing units in which the liquid to be degassed is subjected to an ultrasonic field. Cavitation bubbles which coagulate and can be separated from the liquid are created by the density fluctuations induced by the ultrasound. Ultrasonic degassing units are used in particular to release microbubbles and dissolved gas in oils. An ultrasonic degassing unit which is used in the medical sector is proposed in EP 2 983 733 A1, for instance. However, ultrasonic degassing units are associated with high investment and operating costs, and the constant vibration leads to rapid wear on the corresponding components.

A further possibility for degassing lies in feeding suitable chemicals to the liquid to be degassed, so as bind or convert the gas dissolved in the liquid, e.g. oxygen dissolved in water, such as is described in U.S. Pat. No. 4,348,289 A1, for example. However, the chemical substances additionally required for this degassing method may in some circumstances be substances that are toxic or harmful to the environment, and additional method steps which are more or less complex are required to separate the reaction products from the liquid after the degassing procedure.

In thermal degassing, such as is described in EP 1 429 858 A1, for example, the liquid to be degassed is heated and the gas contained therein is expelled by various methods. However, methods of this type cannot be used for heat-sensitive fluids such as for some foods, for example. Moreover, heating is associated with a significant input in terms of energy.

Moreover, hydrocyclones in which the fluid mixture is set in a rapid revolving movement in a spin chamber, which leads to the separation of the components, are used for separating a fluid mixture. The fluid with the lowest density rotates along the axis in the center, and is extracted upward by an immersion pipe protruding vertically into the spin chamber, while denser constituent parts, such as solids contained in a liquid, concentrate in the outer region of the spin chamber and exit through an exit opening in the base. However, when operating with such fluids that are heavily loaded with solids, the spin chamber may be overloaded and the outlet opening may ultimately be blocked. This applies specifically if additional static installations for generating spin are provided within the spin chamber, as is the case in the subject matter of WO 2014/192896 A1, for example. Therefore, these systems are in any case not, or else not readily, suitable for use with suspensions, thus liquids with solid contaminations. Likewise, hydrocyclones are not that suitable for separating homogeneous multicomponent fluids, thus solutions, for example.

SUMMARY

The invention is based on the object of achieving an apparatus and a method for separating fluid mixtures, in particular for degassing liquids, which overcome the disadvantages of the prior art.

An apparatus according to the invention comprises a nozzle for feeding a fluid mixture composed of a plurality of components into a volume, and a separator that is disposed in the volume so as to be downstream of a nozzle opening of the nozzle.

The nozzle has a conical annular gap that is disposed between a conical inner face of a nozzle casing and a guide cone, and at a tip of said nozzle opens into the volume by way of a nozzle opening, and a fluid feed opening tangentially into the conical annular gap but being axially spaced apart from the nozzle opening. The tangential entry into the annular gap forces the fluid mixture to perform a rotating movement, the angular velocity of the latter drastically increasing up to the nozzle opening. As a result of the high rotating speed, the liquid is ejected as a highly twisted fluid jet into the volume at the nozzle opening. The volume per se herein can be filled with the identical fluid mixture or with another tolerable fluid, in particular an inert gas. The pressure in the volume must be less than the pressure of the fed fluid mixture, but may also be far below, for example between 0.01 bar and 1 bar, at a pressure of, for example, between 2 bar and 20 bar in the fluid feed.

The width of the conical annular gap, i.e. the spacing between the internal wall of the nozzle casing and the outer wall of the guide cone, should not be larger at any point than the internal diameter of the fluid feed at the opening of the latter into the annular gap. The annular gap can have an acute or else an obtuse opening angle. For example, the opening angle is between 30° and 180°, preferably between 45° and 170°, particularly preferably between 60° and 135°, but it is not mandatory for the conical delimiting faces of the annular gap to have straight casing lines. The radial spacing between the conical inner face of the nozzle casing and the outer face of the guide cone between the opening of the fluid feed and the tip of the guide cone is constant or decreases consistently in the direction of the nozzle opening; an enlargement of the spacing between the delimiting faces of the annular gap between the opening of the fluid feed and the nozzle opening, for example while forming a mixing chamber, is not provided according to the invention. Therefore, the volume available to the liquid in the annular gap decreases consistently up to the nozzle opening, as a result of which the axial velocity, and likewise the rotating speed, continuously increase. Owing to the liquid being guided through an annular gap, the rotating speed is in particular higher than in the case of a hollow-conical nozzle body of otherwise identical size.

In the radial direction, there is an intense pressure differential in the highly twisted fluid jet forming in the volume downstream of the nozzle opening, wherein the pressure in a region proximal to the axis is much lower than at the periphery of the fluid jet. As a result, components of the fluid mixture with a low density concentrate in the center of the fluid jet, while components with a comparatively high density accumulate in the outer region of said fluid jet. If the fluid mixture is in particular a liquid with gases dissolved therein, the pressure in the interior of the fluid jet can be so low that degassing of at least one gas takes place. Depending on the initial concentration and the absolute and partial pressures generated, it may even occur that all gases dissolved in the liquid are degassed. The radial pressure differential, and thus the negative pressure in the center of the fluid jet, is determined by the rotating speed of the fluid jet, the latter in turn being determined in particular by the pressure of the fluid prevalent at the fluid feed of the nozzle, the viscosity of the fluid mixture, and by the nozzle geometry, in particular the width and the opening angle of the conical annular gap and the width of the nozzle opening.

By way of its separation portion, the separator is immersed in the fluid jet forming in the volume downstream of the nozzle opening. The separation portion is constructed in such a way that it separates a part of the fluid mixture that lies radially inside in the fluid jet from the remaining fluid mixture, and discharges said part of the fluid mixture by way of a discharge line emanating from the separation portion. Because fluid components with a low density are concentrated in the region of the fluid jet proximal to the axis, as mentioned, the discharged part of the fluid mixture is also composed to a greater extent of fluid components with a low density. The separation effect and the separation output of the separator can be adjusted by varying the spacing between the nozzle opening and the inlet opening of the separator, and by the cross-sectional area of the inlet opening. A pump for discharging components with a low density from the separation portion can be provided downstream of the separation portion in the discharge line.

The apparatus according to the invention does not have any voids, movable installed parts, or other separation elements prone to blocking, such as membranes or filters, in or on the nozzle and is therefore particularly suitable for treating liquids containing solids. Therefore, the apparatus is particularly robust and low-maintenance. The high radial pressure difference in the generated fluid jet makes it possible in particular to remove dissolved gases, or gases present in the form of microbubbles, from a liquid.

The separation portion, which is preferably disposed so as to be radially symmetrical to the axis of the conical annular gap, preferably has the shape of a tubular cylinder, of a perforated disk (aperture) or of a funnel, thus of a pipe or conical front portion having an internal cross section that widens in the direction toward the nozzle opening. If the separation portion has the shape of a tubular cylinder, the casing tube can be equipped radially on the outside with additional elements which facilitate separation, such as an outer casing that widens conically in the direction away from the nozzle opening, for example.

A pump for conveying the fluid mixture to the nozzle is preferably provided in the fluid feed. The pump leads to a defined pressure prevailing at the entry to the annular gap. However, the pump can also be designed so as to be variable in terms of its output and to be able to be feedback-controlled as a function of measured parameters, to which end the apparatus according to the invention can be equipped with a corresponding, for example electronic, control unit which may moreover also be able to assume additional feedback-control tasks in the context of the invention.

A preferably closed container filled with the identical fluid mixture or with another fluid, or a liquid-conducting line, is preferably provided as the volume; however, this may also be an open container, a tank or a body of water. In the case of a liquid-conducting line, for instance a pipeline passed through by a flow of the liquid, the nozzle and the separation portion are preferably disposed concentrically with the pipe axis. The apparatus according to the invention can be particularly easily installed in an existing pipeline and enables a continuous treatment of the medium routed through the pipeline.

A particularly advantageous design embodiment of the invention provides that a phase separator, for example a gas phase separator, which is fluidically connected to the fluid feed by way of a return line is integrated in the discharge line. The fluid mixture of components with a low density, which has been received at the separation device, is further decomposed into components of a different phase in the phase separator, whereby a denser phase is returned to the fluid feed of the nozzle by way of the return line; for example, a gas phase is separated from a gas-rich liquid phase in the phase separator, and the gas-rich liquid phase is subsequently returned to the apparatus according to the invention again in order to be separated. Particularly efficient degassing of a liquid can be carried out as a result of the repeated treatment.

In a progressive design embodiment of the apparatus according to the invention, various adjustment possibilities are provided in order to be able to adapt the separation effect of the separator to the respective requirements. These include in particular means for being able to vary the axial spacing between the nozzle opening and the inlet opening of the separator and/or the axial position of the guide cone of the nozzle relative to the conical inner face of the nozzle casing.

A heating device is expediently provided in the fluid feed and/or in the nozzle casing and/or in the guide cone. By heating the fluid mixture before and/or while passing through the nozzle, the viscosity of the former is reduced, as a result of which the rotating speed of the fluid jet is in particular increased, the pressure in the center of the fluid jet being able to be further reduced in this way. The reduction in viscosity is advantageous when treating oils loaded with undesirable substances, for example. Substances with a comparatively high melting point such as greases, for example, can also be relieved of gases dissolved therein in this way. In general, the solubility of gases dissolved in the fluid is reduced by the higher temperature, and degassing is facilitated in this way.

A likewise advantageous design embodiment of the invention provides that a feed line by way of which an inert gas is introduced into the fluid mixture opens into the fluid feed. "Inert gas" in this context means a gas which does not chemically react with the components of the fluid mixture and in particular does not contain any or only a minor amount of components of a gas to be removed from the fluid mixture. As a result of the partial pressure of these components that is reduced to this extent, the inert gas can thus be used as a "sparging gas" in order to facilitate the degassing of a gas contained, in particular dissolved, in the fluid mixture. Moreover, the inert gas which is additionally introduced reduces the viscosity of the fluid mixture, and thus the rotating speed of the fluid mixture at the nozzle opening.

The separator is preferably equipped with means for actively facilitating the separation of the components of the fluid mixture. "Active" means herein are to be understood to mean those that are moved by an additional external drive such as a motor, for instance. Such a means is, for instance, a perforated disk which is disposed at the inlet opening of the separation portion, or within the separation portion, and is populated with blades or similar means, and which is either rotatably mounted or is able to be moved conjointly with the separation portion, the latter being rotatably mounted as an entity, and which can be set in rapid rotation by means of a motor, the rotating speed of said perforated disk even exceeding the rotating speed in the fluid jet. The fluid mixture located outside a tight region about the axis of the fluid jet is ejected outward by the disk, as a result of which the negative pressure in the center of the fluid jet is further amplified.

In a likewise advantageous variant of the invention, the nozzle is equipped with a demixing chamber between the tip of the guide cone and the nozzle opening. The demixing chamber is a cylindrical chamber which is disposed in front of the nozzle tip of the guide cone, so as to be axially symmetrical to the conical annular gap, the length of said demixing chamber being, for example, 0.5 to 2 times that of the guide cone, and the entry opening of said demixing chamber proximal to the guide cone being larger than the exit opening disposed on the opposite end side. In this case, the separator is disposed downstream of the exit opening of the demixing chamber, so as to be spaced apart from the latter.

The apparatus is advantageously equipped with an ultrasonic device for facilitating the separation of different phases in the fluid mixture, for example a gas phase from a liquid phase. The ultrasonic device can be constructed in such a way that the guide cone and/or the nozzle as an entity and/or the separator, and/or a line and/or a container in which the apparatus is disposed, are/is set in rapid ultrasound-generating vibration. Zones with dissimilar pressure, which facilitate the creation of cavitation, are formed in the fluid mixture during the vibration. For example, gas bubbles of a gas dissolved in the fluid mixture are formed in the cavitations. The gas bubbles coagulate with one another and can subsequently be removed from the fluid mixture by means of the separator.

In order to achieve a desired separation effect, for example the removal of a dissolved gas from a liquid, the user of the apparatus according to the invention has available a multiplicity of parameters which he/she can adjust so as to correspond to the task to be performed. These parameters include, in particular, the cross-sectional area of the nozzle opening, the position of the guide cone in the nozzle, the pressure in the fluid line, the spacing between the nozzle opening and the separator in the volume, the cross-sectional area at an entry opening on the separator, the shape of the separator, the cross-sectional area of the nozzle opening, the position of the guide cone in the nozzle, or the pressure in the fluid line.

In the method according to the invention, the separation of the fluid mixture is performed as follows. First, for example while using a pump, a fluid mixture composed of a plurality of components is fed to a nozzle which has a conical annular gap, thus a volume which is delimited by two conical faces, wherein the fluid mixture is fed into the conical annular gap by way of a fluid feed that opens tangentially into the annular gap. The fluid mixture in the conical annular gap is forced into a helically constricted path and, at a nozzle opening disposed at the tip of the conical annular gap, ejected in the form of a twisted (fluid) jet into a fluid-filled volume. A zone of reduced pressure which ensures that components of dissimilar density in the fluid mixture are at least partially demixed in the radial direction is formed in the twisted jet as a result, whereby components with a relatively low density accumulate in the center, while components with a comparatively high density accumulate on the periphery of the twisted jet. Finally, fluid mixture is extracted from the zone of reduced pressure in the twisted jet and separated from the remaining fluid mixture with the aid of a separator. The dynamic pressure of the fluid mixture in the twisted jet is typically sufficient to cause the components with a comparatively low density to separate in the separator; optionally, the separator may also be equipped with means to apply a negative pressure, for instance a pump or a line system in which the weight of the extracted fluid is utilized for generating a negative pressure, so as to be even better able to extract those components of the fluid mixture that are situated in the center of the twisted jet.

In this way, the method according to the invention enables a continuous separation of components of dissimilar density from the fluid mixture. In particular, the method according to the invention enables continuous degassing of a flow of liquid or of a suspension.

The volume herein can be filled with the same fluid mixture, or components thereof, as the fluid mixture to be treated according to the method. In an advantageous variant of the method, the volume is filled with an inert gas. The inert gas is a gas which does not react, or only reacts to an insignificant extent, with the components of the fluid mixture to be treated, and does not dissolve in the fluid mixture or a component of the fluid mixture, or a solution of this type does not have any negative effect on the outcome of the method. The inert gas can be, for example, carbon dioxide, nitrogen, or a noble gas. Because the frictional resistance of the fluid mixture exiting the nozzle opening is lower in a gas atmosphere than in a liquid, the acting centrifugal forces are higher and the zone of reduced pressure being formed in the exiting twisted fluid jet has an even lower pressure, this resulting in an increased separation output.

A preferred design embodiment of the invention provides that the nozzle and the separator are integrated in a partial circuit for the fluid mixture. After passing through the separator, the separated fluid mixture is in turn subjected to separation, and the relatively dens medium created in the process is returned to the fluid feed to the nozzle. For example, a gas-rich liquid phase is separated from the fluid mixture in the separator. The gas-rich liquid phase is fed to a phase separator in which a created gas phase is separated. The remaining gas-rich liquid phase is returned to the feed line of the nozzle by way of a return line. A conveying device, for example an electric pump, by means of which liquid is continuously retrieved from the liquid volume and fed into the fluid feed line upstream of the nozzle is preferably disposed in the return line.

The apparatus according to the invention and the method according to the invention are particularly suitable for degassing homogeneous or nonhomogeneous multicomponent fluids such as solutions, liquids or suspensions. The liquid is, for example, water, in particular process water, waste water or cooling water, or a solution or suspension. The gas to be separated is, for example, air, oxygen, nitrogen, carbon dioxide or any other gas, or a plurality of gases, which is/are at least partially present in dissolved form in the liquid. The invention is in particular suitable for separating dissolved argon from water in the course of preparing the water for electrolysis. Likewise, the apparatus according to the invention and the method according to the invention are suitable for treating oils, in particular native oils or hydraulic oils. Native oils are heavily loaded with moisture and/or atmospheric oxygen after pressing, this contributing heavily toward their aging. Undesirable constituent parts of this type can be removed in a simple and gentle manner by the invention. Hydraulic oils have to be degassed in order to preclude the systems failing on account of cavitation. The invention can likewise be considered for the use in separating heavy and light fractions in petrochemical engineering. However, the invention is not restricted to the examples set forth herein but can be used in a multiplicity of further applications.

In comparison to the methods known in the prior art, said method has a comparatively low input of energy, requires no additional substances for carrying out the separation, and is gentle to the liquid to be treated and the material used. Said apparatus and method are however also suitable for separating other fluid mixtures such as solutions, suspensions, emulsions or azeotropic mixtures; the only requirement is that there are two components of dissimilar density in the fluid mixture.

BRIEF DESCRIPTION OF THE DRAWINGS

Exemplary embodiments of the invention are to be explained in more detail by means of the drawings. In schematic views in the drawings.

DETAILED DESCRIPTION

Figure 1A:
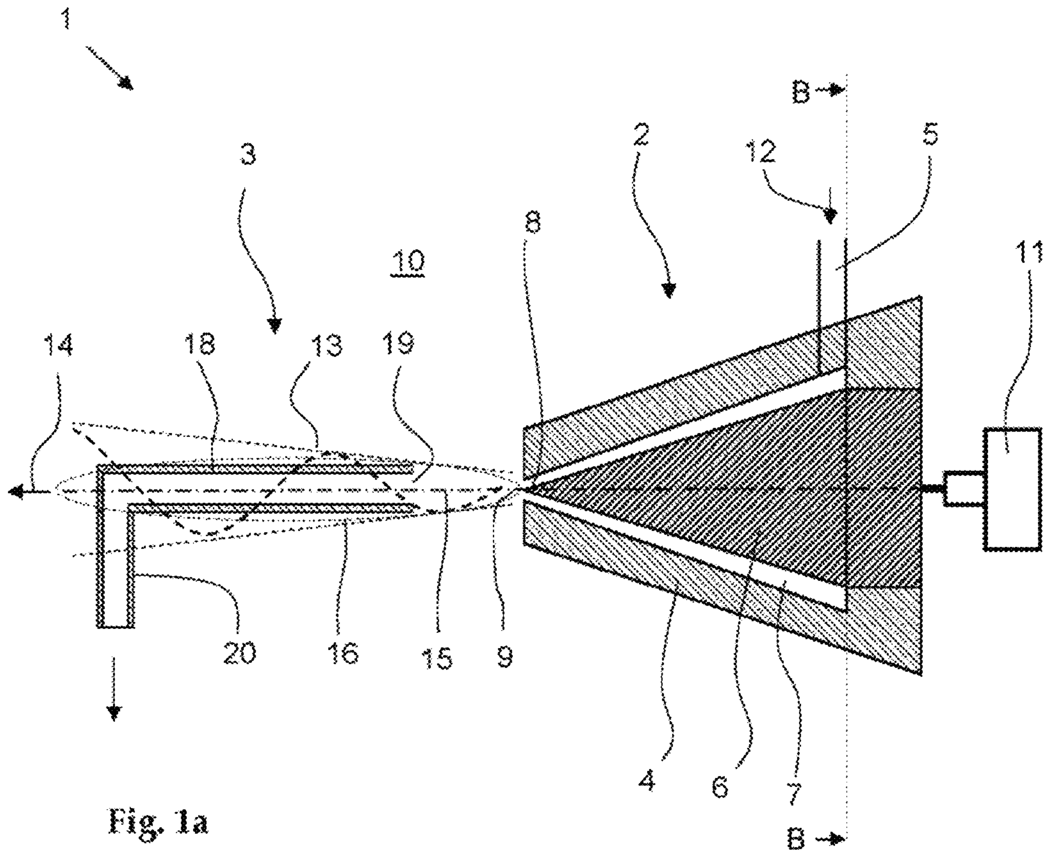
FIG. 1*a* shows an apparatus according to the invention in a first embodiment, in a longitudinal sectional view.
Figure 1B:
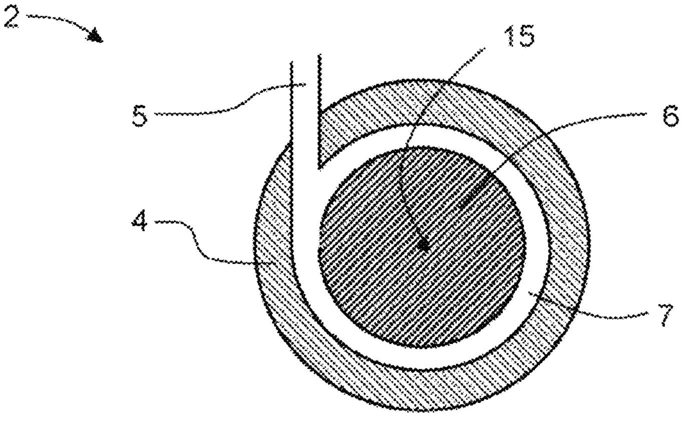
FIG. 1*b* shows the apparatus from FIG. 1*a* in the cross section along the section line B-B in FIG. 1*a;*

The apparatus 1 shown in FIG. 1*a* and FIG. 1*b* comprises a nozzle 2 and, spaced apart therefrom, a separator 3. The nozzle 2 comprises a nozzle casing 4 which has a conical inner face into which a fluid feed 5 opens tangentially. A likewise conically shaped guide cone 6 is disposed within the nozzle casing 4 in such a manner that a conical annular gap 7 lies opening between the inner wall of the nozzle casing 4 and the outer wall of the guide cone 6, preferably in such a manner that the cone tip 8 of the guide cone 6 is substantially co-aligned with a nozzle opening 9 of the nozzle 2. The flow cross sections of the nozzle opening 9, annular gap 7 and fluid feed 5 are preferably chosen to be of substantially identical size. The inner face of the conical nozzle casing 4 and the outer face of the guide cone 6 herein can have the same opening angle; however, it is also conceivable that the opening angle of the outer face of the guide cone 6 is more acute than the opening angle of the inner face of the nozzle casing 4, and the spacing of the nozzle casing 4 and the guide cone 6 decreases in the direction toward the nozzle opening 9, as is shown in FIG. 1*a*.

The nozzle 2 and the separator 3 are received within a volume 10, the latter being, for example, a container or a line. In the exemplary embodiment shown here, the volume 10 is filled with the same medium as is introduced by way of the nozzle 3. The medium is a fluid mixture composed of a plurality of components, such as for instance a suspension, a mixture of two liquids, or a solution. This is, for example, a liquid such as water, in which a gas, for instance oxygen, is dissolved, the latter to be at least partially separated from the liquid with the aid of the apparatus according to the invention.

In order to guarantee an ideally efficient rotational acceleration of the medium introduced into the nozzle 3, a ramp—not shown here—can moreover be provided in the annular gap 7, by way of which ramp the base area of the annular gap 7 does not define a flat annulus but a turn of a helical face which ascends in the direction toward the nozzle opening 9 and which at the ramp end thereof terminates in the direction of the nozzle opening 9 at a height corresponding to the diameter of the fluid feed 5. In this way, after having passed the ramp, the medium does not laterally impact the flow of the medium simultaneously being introduced by way of the fluid feed 5, but is guided past the latter medium so as to be offset in the direction toward the nozzle opening 9, as a result of which turbulences counteracting the acceleration of the medium are avoided.

The guide cone 6 can be fixedly assembled within the nozzle casing 4, or be received so as to be movable axially by means of a manual or motorized displacement device 11, as is shown here, so as to adapt the apparatus 1 to the characteristics of the treated medium and/or to the respective operative task.

During the operation of the nozzle 2, a fluid mixture to be treated, for example a liquid to be degassed, is introduced in the direction of the arrow 12 into the annular gap 7 at a pressure of, for example, 2 to 5 bar by way of the fluid feed 5. The fluid mixture in the annular gap 7 is set in rapid rotating movement, the angular velocity of the latter, owing to the radius of the annular gap 7 decreasing in the flow direction, increasing up to the nozzle opening 9. For the same reason, the linear speed component directed in the direction of the nozzle opening 9 also increases. The fluid mixture exits the nozzle 2 at the nozzle opening 9, and is introduced into the volume 10 in the direction of the arrow 14 as a highly twisted jet 13 with a high torque and a high axial velocity. By virtue of the high rotating speed, a zone 16 of highly reduced pressure is created along a central axis 15 of the jet 13, this at the same time being the symmetry axis of the annular gap 7. Components with a comparatively low density from the fluid mixture accumulate in the zone 16. For example, gas dissolved in the liquid degasses and accumulates in the form of a multiplicity of small gas bubbles, or as a single gas bubble, in the zone 16.

For example, in an experimental device corresponding to the apparatus 1, a pressure of 350 mbar and below was measured in front of the nozzle opening 9 in the volume 10 at a pressure of 5 bar in the fluid feed, a volumetric flow rate of 1.2 l/h of an aqueous solution and an opening cross section of the nozzle opening 9 of 7 mm. The negative pressure generated can be varied within a wide range as a result of different delivery pressures, volumetric flow rates and nozzle dimensions.

The separator 3 by way of a separation portion 18 is immersed in the zone 16. The separation portion 18 in the exemplary embodiment shown in FIG. 1*a* is a tubular cylinder which is disposed so as to be radially symmetrical to the axis 15 in the volume 10, the front inlet opening 19 of said tubular cylinder being spaced apart axially from the nozzle opening 8. The cross-sectional area of the inlet opening 19 in the exemplary embodiment is approximately equal to that of the nozzle opening 9, but it may also be chosen to be larger or smaller. The separation portion 18 is fluidically connected to a discharge line 20 by way of which fluid mixture from the volume 10 that invades the separation portion 18 is extracted.

In the example of a liquid loaded with dissolved gas as the fluid mixture already mentioned several times herein, gas or a gas-rich fraction accumulates in the zone 16, said gas having previously been dissolved in the liquid introduced by way of the nozzle 2. Constituent parts of the fluid with a comparatively high density, for example a liquid phase or a phase with a minor proportion of gas, are to be found at a comparatively large radial spacing from the axis 15. All constituent parts of the fluid move at a high speed in the axial direction and have a correspondingly high kinetic energy. Since a considerable negative pressure is prevalent in the zone 16, the retrieval of the constituent parts of the fluid from this region usually requires an even higher negative pressure downstream of the separation portion 18, the latter negative pressure being generated by a vacuum pump, for example, which is disposed in the discharge line 20 (not shown here). Such a vacuum pump is typically required if gas is to be extracted substantially exclusively from the center of the twisted jet 13.

However, a vacuum pump can be dispensed with in certain circumstances. If the diameter of the separation portion 18 is enlarged, constituent parts of the fluid with a comparatively high density increasingly make their way into the separation portion 18, as a result of which the kinetic energy density of all of the constituent parts of the fluid introduced into the separation portion 18, and thus the backpressure, is increased. If the backpressure exceeds the negative pressure in the separation portion 18, no additional means are required for extracting the constituent parts of the fluid located in the separation portion.

The constituent parts of the fluid present in the separation portion 18 are extracted by way of the discharge line 20, while the remaining constituent parts of the fluid remain in the volume 10 and are fed to another kind of use.

If the assembly from FIG. 1*a*, 1*b* is used for degassing liquids or suspensions, said assembly is moreover preferably disposed vertically, i.e. having a nozzle 2 which by way of its tip points upward, and a separator 3 disposed above the latter. As a result of a vertical assembly, the separated gas can escape upward in a gas phase separator (not shown in FIG. 1*a*) disposed downstream of the discharge line 20, while the remaining liquid, or the remaining suspension, in the gas phase separator can be returned to the fluid feed 5.

Various embodiments of a separator which can be used in the invention are shown in FIGS. 2*a* to 2*d*.

Figure 2A:
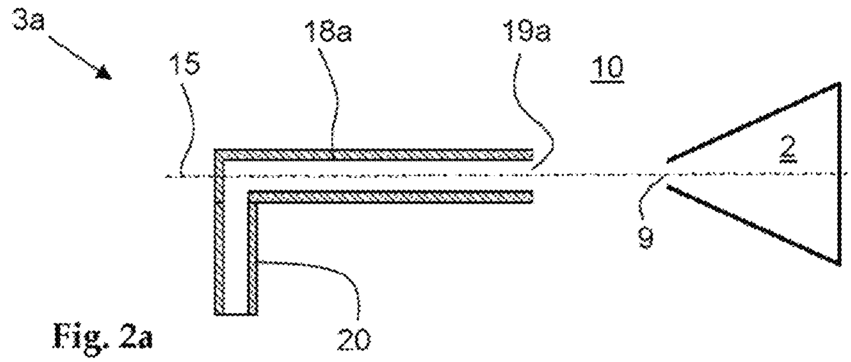
FIGS. 2*a*-2*d* show different design embodiments of a separator of an apparatus according to the invention.

Visualized once more in FIG. 2*a* is a separator 3*a* of the type of separator 3 shown in FIG. 1*a*. The separator 3*a* has a tubular separation portion 18*a* which is disposed so as to be rotationally symmetrical about an axis 15, which is shared with the nozzle 2 (only indicated in FIGS. 2*a* to 2*d*), and by way of an inlet opening 19*a* is disposed so as to be spaced apart from the nozzle opening 9.

Figure 2B:
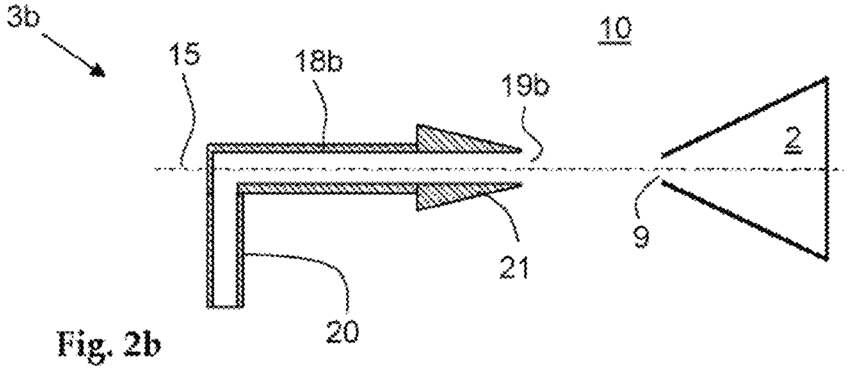

The separator 3*b* shown in FIG. 2*b* has a separation portion 18*b* which in the region of the inlet opening 19*b* thereof has an outer casing 21 that widens conically in the direction from the nozzle opening 9. Owing to the conical outer casing 21, the flow exiting the nozzle opening 9 is deflected radially outward, as a result of which the pressure in a region proximal to the axis 15 at the inlet opening 19*b* is further reduced.

Figure 2C:
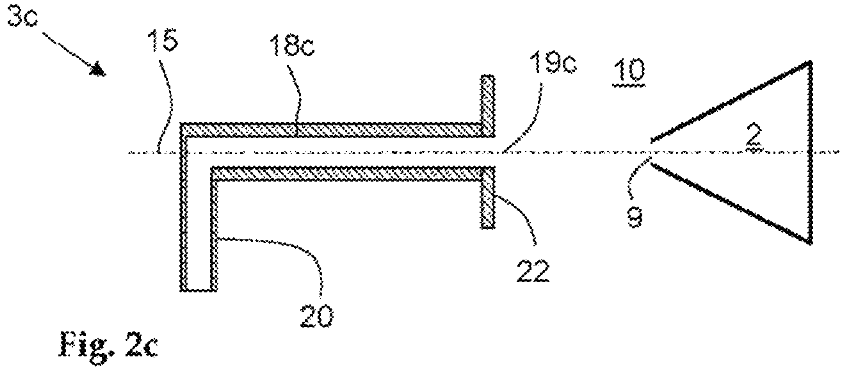

In FIG. 2*c*, the separation portion 18*c* of a separator 3*c* has an aperture in the form of a perforated disk 22 which is disposed in a circular manner about the inlet opening 19*c* and is perpendicular to the axis 15. Owing to the perforated disk 22, the medium exiting the nozzle opening 9 is radially deflected, while only a comparatively small proportion of the medium makes its way through the inlet opening 19*c* into the interior of the separation portion 18*c*. This variant also contributes toward an amplification of the pressure difference between a region proximal to the axis 15 and the regions lying radially outward in comparison.

Figure 2D:
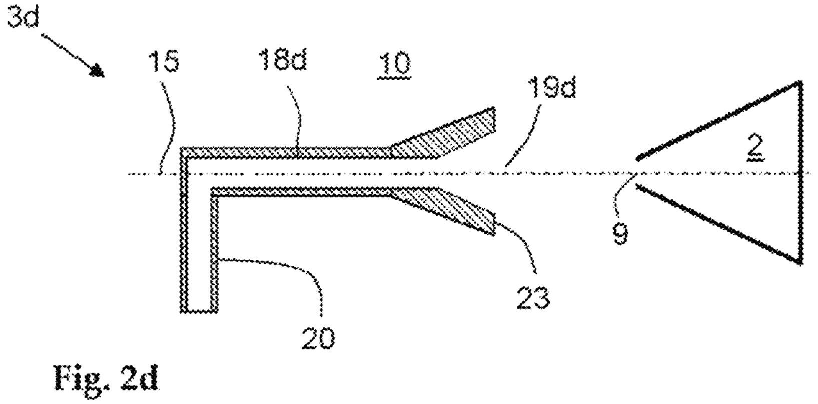

Shown in FIG. 2*d* is a separator 3*d* which on the inlet opening 19*d* of the separation portion 18*d* of the former has a funnel 23. In comparison to the embodiment shown in FIG. 2*a*, the funnel 23 increases the proportion of the medium exiting the nozzle opening 9, said medium being introduced into the interior of the separation portion 18*d*, in comparison to the proportion that is guided past the separation portion 19*d* on the outside, this however being at the expense of the negative pressure prevalent in the region of the axis 15 relative to the other regions in the volume 10.

Figure 3A:
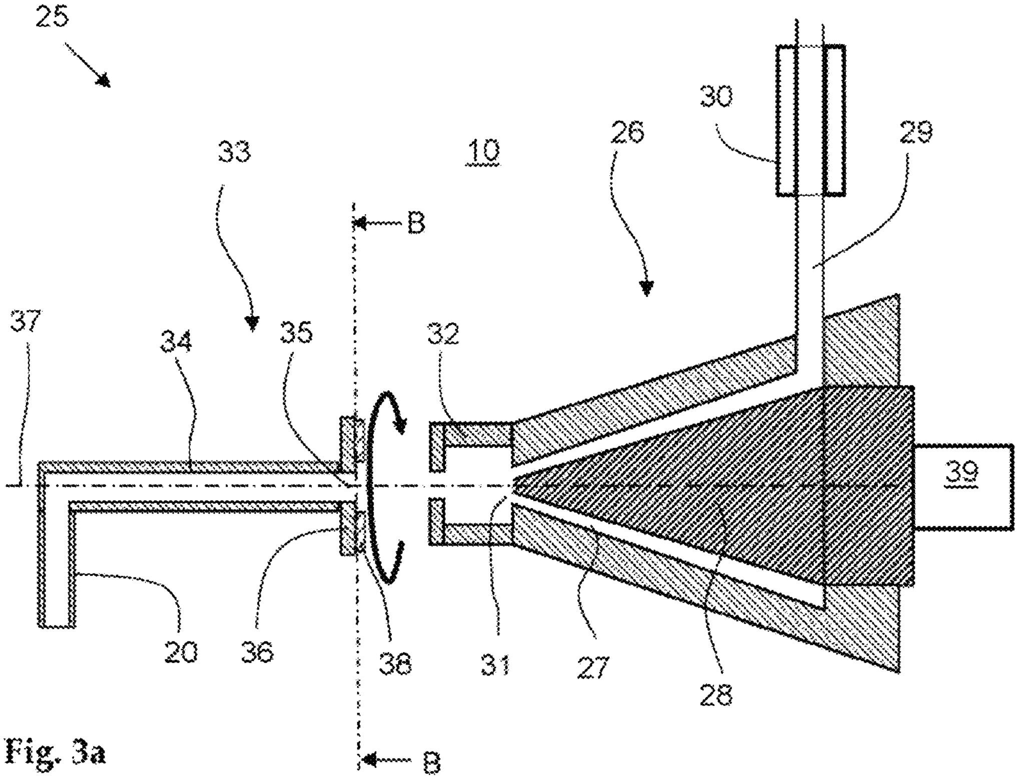
FIG. 3*a* shows an apparatus according to the invention in another embodiment, in a longitudinal sectional view.
Figure 3B:
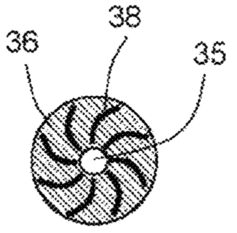
FIG. 3*b* shows the apparatus from FIG. 3*a* in the cross section along the section line B-B in FIG. 3*a*.

FIG. 3*a* shows an apparatus 25 according to the invention of another embodiment. In a manner similar to that of the apparatus 1, the apparatus 25 shown in FIG. 3*a* has a nozzle 26 having a guide cone 28, which is disposed so as to be movable axially while forming an annular gap 27, and a fluid feed line 29 opening into the annular gap 27. In the apparatus 25, a heating element 30, for example an electric heating device, by means of which the fluid mixture can be heated and the viscosity of the latter thus reduced, is additionally disposed in the fluid feed 29. Furthermore, a tubular demixing chamber 32, which facilitates the separation of the fluid mixture exiting the nozzle 26, is disposed downstream of the nozzle opening 31 of the nozzle 26. The length and the cross section of the demixing chamber 32 herein may vary so as to achieve a positive separation effect for the respective fluid mixture.

The apparatus 25 moreover has a separator 33 having a tubular-cylindrical separation portion 34, the end side of the latter lying opposite the nozzle 27 having an inlet opening 35. A perforated disk 36 is mounted on this end side so as to be rotatable about a longitudinal axis 37, said perforated disk 36 being able to be set in rapid rotation by a drive apparatus not shown here. Blades 38 are disposed on that side of the perforated disk 36 that faces the nozzle 26.

During the operation of the apparatus 25, the perforated disk 36 is set in rotating movement about the longitudinal axis 37, the rotating speed of said rotating movement even exceeding the rotating speed of the fluid jet being formed in front of the demixing chamber 32. An additional separation of components of dissimilar density in the treated fluid mixture is caused as a result.

Furthermore, the apparatus 25 is equipped with an ultrasonic generator 39, by means of which the guide cone 28 can be set in vibration of very high frequency (ultrasonic vibrations), for example. Generated as a result are cavitations in the fluid mixture to be treated downstream of the nozzle opening 31, dissolved gas from the fluid mixture being able to degas into said cavitations. The efficiency of the apparatus 25 is further increased as a result. Moreover, instead of the guide cone 28, the entire nozzle 25 or the nozzle casing enclosing the guide cone 28 can also be set in ultrasonic vibration, for example.

Figure 4:
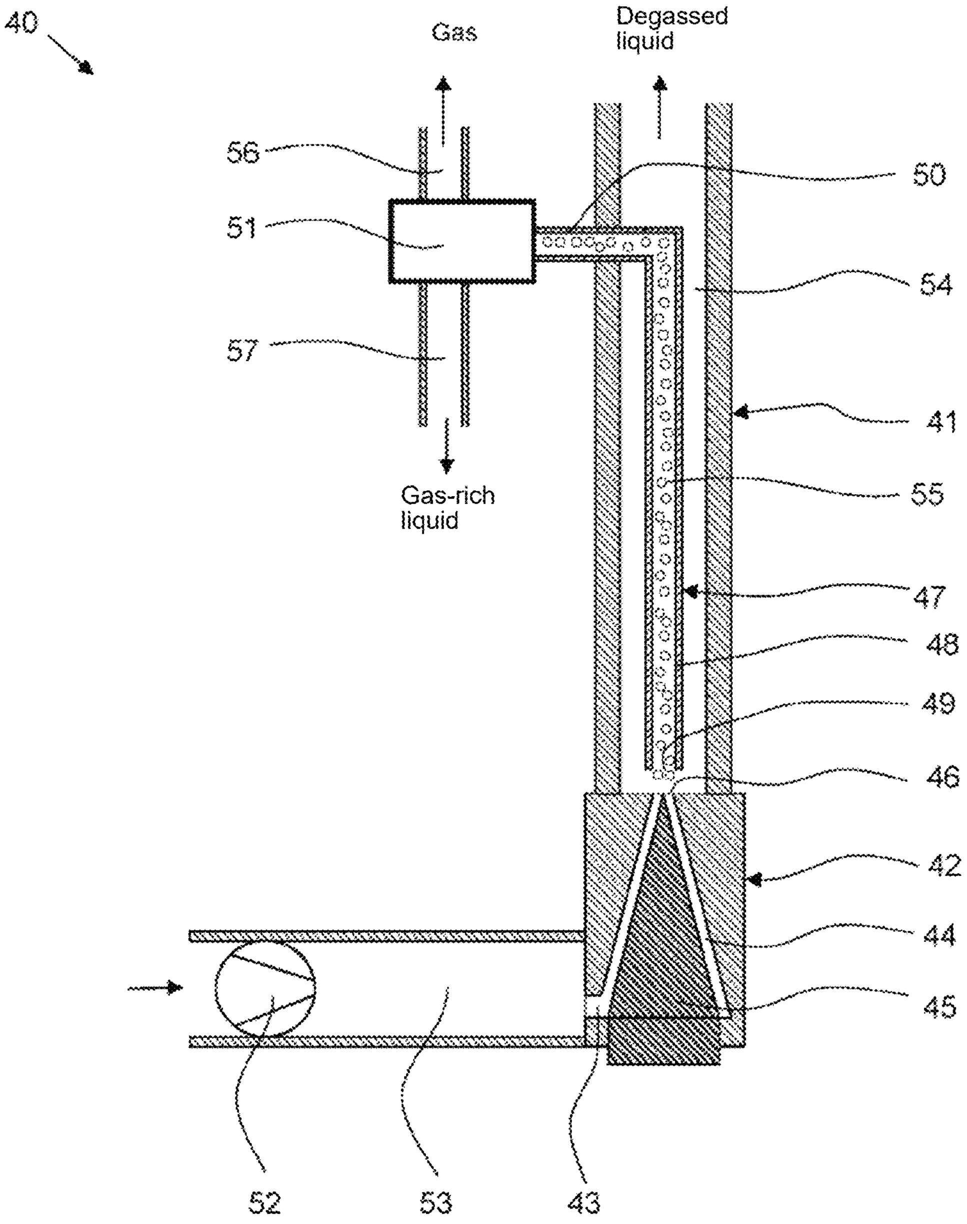
FIG. 4 shows an apparatus according to the invention in a further embodiment.

The apparatus 40 according to the invention shown in FIG. 4 is integrated in a pipeline 41 and specified, for example, to continuously degas a liquid routed through the pipeline 41. The apparatus 40 comprises a nozzle 42 having a fluid feed 43, annular gap 44, guide cone 45 and nozzle opening 46 and a separator 47 which by way of a separation portion 48 is disposed within the pipeline 41 downstream of the nozzle opening 46 and has an inlet opening 49 that is axially spaced apart from the nozzle opening 46. The separation portion 48 is connected to a gas phase separator 51 by way of a discharge line 50.

During the operation of the apparatus 40, a liquid loaded with gas, for example process water in which oxygen is dissolved, is guided by means of a pump 52 through an upstream portion 53 of the pipeline 41 to the nozzle 42. The liquid in the nozzle 42 is set in intense rotation and, while forming a heavily twisted liquid jet, exits the nozzle opening 46 at a high axial velocity into a downstream portion 54 of the pipeline 41. Owing to the intense rotating movement, a negative pressure which is sufficient to allow the gas dissolved in the liquid to degas, while forming gas bubbles 55, is generated in the center of the twisted liquid jet. The separation portion 48 of the separator 47, disposed so as to be centric in the portion 54 of the pipeline 41, at the inlet opening 49 thereof is immersed in the center of the highly twisted liquid jet, and as a result separates a gas-rich phase from the liquid. Owing to the high backpressure in the separation portion 48, the gas-rich phase of the liquid is fed to the gas phase separator 51 by way of the discharge line 50, in which gas phase separator 51 the already degassed phase is separated from the remaining gas-rich liquid and discharged by way of a gas discharge line 56. The remaining gas-rich liquid is discharged by way of a liquid discharge line 57 and can optionally be returned to the pipeline portion 53 upstream of the pump 52, or fed to another kind of use. The liquid flow remaining in the pipeline portion 54 has a highly reduced proportion of gas.

The invention is moreover not restricted to the exemplary embodiments shown here. Rather, various features of the apparatuses 1, 25, 40 can be combined with one another in an arbitrary manner, or the apparatuses 1, 25, 40 can be enhanced with further features. For example, a heating device or an ultrasonic generator can also be provided in the apparatuses 1, 40, or a gas feed line, not shown here, opens into the fluid feed 5, 29, 43 so as to reduce the viscosity of the fluid mixture to be treated with a fed sparging gas. Likewise, various operating parameters of an apparatus according to the invention such as, for example, the heating output of the heating element 30, the width of the annular gap 7, 27, 44, the spacing of the separator 3, **3*a*, 3*b*, 3*c*, 3*d*, 33, 47 from the nozzle 2, 26, 42, or the pressure of a pump conveying the fluid mixture to be treated to the nozzle 2, 26, 42** can be feedback-controlled by means of an electronic controller, not shown here, as a function of continuously measured parameters such as, for example, the temperature or the viscosity of the fluid mixture.

LIST OF REFERENCE SIGNS

1 Apparatus
2 Nozzle
3, **3*a*, 3*b*, 3*c*, 3*d*** Separator
4 Nozzle casing
5 Fluid feed
6 Guide cone
7 Annular gap
8 Cone tip
9 Nozzle opening
10 Volume
11 Displacement device
12 Arrow
13 Jet
14 Arrow
15 Axis
16 Zone
17 -
18, **18*a*, 18*b*, 18*c*, 18*d*** Separation portion
19, **19*a*, 19*b*, 19*c*, 19*d*** Inlet opening
20 Discharge line
21 Outer casing
22 Perforated disk
23 Funnel
24 -
25 Apparatus
26 Nozzle
27 Annular gap
28 Guide cone
29 Fluid feed
30 Heating element
31 Nozzle opening
32 Demixing chamber
33 Separator
34 Separation portion
35 Inlet opening
36 Perforated disk
37 Longitudinal axis
38 Blades
39 Ultrasonic generator
40 Apparatus
41 Pipeline
42 Nozzle
43 Fluid feed

44 Annular gap
45 Guide cone
46 Nozzle opening
47 Separator
48 Separation portion
49 Inlet opening
50 Discharge line
51 Gas phase separator
52 Pump
53 Portion (of the pipeline)
54 Portion (of the pipeline)
55 Gas bubble
56 Gas discharge line
57 Liquid discharge line

The invention claimed is:

1. An apparatus for separating fluid mixtures, the apparatus comprising:
- a nozzle for feeding a fluid mixture composed of a plurality of components into a volume, the nozzle comprising:
  - a conical annular gap that is disposed between a conical inner face of a nozzle casing and a guide cone, and at a nozzle opening at the tip of said nozzle opens into the volume; and
  - a fluid feed opening tangentially into the conical annular gap; and
- a separator comprising:
  - a separation portion that is disposed in the volume and is fluidically connected to a discharge line; and
  - an inlet opening disposed concentrically with the nozzle opening and axially spaced apart from the latter;

wherein a phase separator, which is fluidically connected to the fluid feed by way of a return line, is integrated in the discharge line of the separator.

2. The apparatus as claimed in claim 1, wherein the separation portion has an end portion which faces the nozzle and has the shape of a tubular cylinder, of a perforated disk, or of a funnel.

3. The apparatus as claimed in claim 1, wherein a pump for conveying the fluid mixture to the nozzle is integrated in the fluid feed.

4. The apparatus as claimed in claim 1, wherein a container filled with a fluid, or a fluid-conducting line, is provided as the volume.

5. The apparatus as claimed in claim 1, wherein the axial spacing between the nozzle opening and the inlet opening of the separator and/or the axial position of the guide cone of the nozzle relative to the conical inner face of the nozzle casing is adjustable.

6. The apparatus as claimed in claim 1, wherein a heating device is provided in the fluid feed, in the nozzle casing and/or in the guide cone.

7. The apparatus as claimed in claim 1, wherein a feed line for a sparging gas opens into the fluid feed and/or into the annular gap.

8. The apparatus as claimed in claim 1, wherein the separator is equipped with means for actively reinforcing radial separation of components of dissimilar density in the fluid mixture.

9. The apparatus as claimed in claim 1, wherein the nozzle is equipped with a demixing chamber between the tip of the guide cone and the nozzle opening.

10. The apparatus as claimed in claim 1, further comprising an ultrasonic device for generating short-term local pressure gradients in the fluid mixture.

11. A method for separating fluid mixtures, in which;
- a. a fluid mixture composed of a plurality of components is fed to a nozzle which has a conical annular gap, wherein the fluid mixture is fed into the conical annular gap by way of a fluid feed that opens tangentially into the annular gap;
- b. the fluid mixture in the conical annular gap is forced into a helically constricted path and, at a nozzle opening disposed at the tip of the conical annular gap, ejected in the form of a twisted jet into a volume, wherein a zone of reduced pressure is formed in the twisted jet, and components of dissimilar density in the fluid mixture are at least partially demixed in the radial direction; and
- c. fluid mixture is extracted from the zone of reduced pressure and separated from the remaining fluid mixture with the aid of a separator, which is disposed in front of the nozzle opening in the volume;

wherein the fluid mixture extracted from the zone is subjected to phase separation, and a denser phase which is separated in the process is again fed to the nozzle.

12. The method as claimed in claim 11, wherein the volume before or during the introduction of the fluid mixture is filled with an identical fluid mixture or with an inert gas.

13. The use of a method as claimed in claim 11, for degassing liquids or suspensions.

14. An apparatus for separating fluid mixtures, the apparatus comprising:
- a nozzle for feeding a fluid mixture composed of a plurality of components into a volume, the nozzle comprising:
  - a conical annular gap that is disposed between a conical inner face of a nozzle casing and a guide cone, and at a nozzle opening at the tip of said nozzle opens into the volume; and
  - a fluid feed opening tangentially into the conical annular gap; and
- a separator comprising:
  - a separation portion that is disposed in the volume and is fluidically connected to a discharge line; and
  - an inlet opening disposed concentrically with the nozzle opening and axially spaced apart from the latter;

wherein a feed line for a sparging gas opens into the fluid feed and/or into the annular gap.

* * * * *